United States Patent
Neave

(10) Patent No.: US 10,908,316 B2
(45) Date of Patent: Feb. 2, 2021

(54) RASTER LOG DIGITIZATION SYSTEM AND METHOD

(71) Applicant: Drilling Info, Inc., Austin, TX (US)

(72) Inventor: John Neave, Centennial, CO (US)

(73) Assignee: Drilling Info, Inc., Austin, TX (US)

( * ) Notice: Subject to any disclaimer, the term of this patent is extended or adjusted under 35 U.S.C. 154(b) by 252 days.

(21) Appl. No.: 14/884,701

(22) Filed: Oct. 15, 2015

(65) Prior Publication Data
US 2017/0108614 A1    Apr. 20, 2017

(51) Int. Cl.
*G01V 11/00*    (2006.01)
(52) U.S. Cl.
CPC .................................. *G01V 11/002* (2013.01)
(58) Field of Classification Search
CPC ................................................... G01V 11/002
USPC ......................................................... 345/440
See application file for complete search history.

(56) References Cited

U.S. PATENT DOCUMENTS

| | | | |
|---|---|---|---|
| 4,633,400 A | 12/1986 | Chittineni | |
| 5,003,813 A | 4/1991 | Hayes | |
| 5,056,066 A | 10/1991 | Howard | |
| 5,835,882 A | 11/1998 | Vienot et al. | |
| 5,987,388 A | 11/1999 | Crawford | |
| 6,003,027 A | 12/1999 | Prager | |
| 6,223,126 B1 | 4/2001 | Neff et al. | |
| 6,295,504 B1 | 9/2001 | Ye et al. | |
| 6,965,383 B2 * | 11/2005 | Ritter | G01R 13/0227 345/173 |
| 7,054,753 B1 | 5/2006 | Williams et al. | |
| 7,069,149 B2 | 6/2006 | Goff | |
| 7,516,055 B2 | 4/2009 | Strebelle et al. | |
| 7,525,349 B2 | 4/2009 | Mavoori et al. | |
| 8,265,876 B1 | 9/2012 | Yu et al. | |
| 8,265,879 B2 | 9/2012 | Kurnik et al. | |
| 8,826,879 B2 | 9/2014 | Lee | |
| 9,182,511 B2 | 11/2015 | Neave | |
| 9,418,339 B1 | 8/2016 | Leonard | |
| 9,618,639 B2 | 4/2017 | Witte et al. | |
| 2002/0140699 A1 * | 10/2002 | Miyadai | G06T 11/206 345/440 |

(Continued)

FOREIGN PATENT DOCUMENTS

| | | |
|---|---|---|
| CN | 1797039 | 7/2006 |
| CN | 102066980 | 5/2011 |

(Continued)

OTHER PUBLICATIONS

PCT/US13/68348, PCT International Search Report dated Apr. 29, 2014 (3 pgs.).

(Continued)

*Primary Examiner* — Hai Tao Sun
(74) *Attorney, Agent, or Firm* — Fish & Richardson P.C.

(57) ABSTRACT

A raster log digitization system and method are disclosed. The system and method receives a raster log in which the raster log has one or more values of one or more measurements of a well and each value of each measurement being recorded at a plurality of depths of the well. In the raster log, the value of at least one measurement wraps around the raster log. The system and method may generate using the received raster log a digital log from the raster log wherein the digital log resolves the values of at least one measurement that wrapped around the raster log.

20 Claims, 10 Drawing Sheets

(56) References Cited

U.S. PATENT DOCUMENTS

| | | | |
|---|---|---|---|
| 2002/0184083 | A1 | 12/2002 | Nakano et al. |
| 2004/0015296 | A1 | 1/2004 | Causse et al. |
| 2004/0220790 | A1 | 11/2004 | Cullick et al. |
| 2004/0260476 | A1 | 12/2004 | Borgos |
| 2005/0209897 | A1 | 9/2005 | Luhr |
| 2006/0052937 | A1 | 3/2006 | Zoraster et al. |
| 2006/0075007 | A1* | 4/2006 | Anderson ............. G06F 3/0608 |
| 2006/0193205 | A1 | 8/2006 | Herkenhoff |
| 2006/0274386 | A1 | 12/2006 | Wakazono et al. |
| 2007/0276604 | A1* | 11/2007 | Williams ................. G01V 1/50 |
| | | | 702/16 |
| 2008/0033935 | A1 | 2/2008 | Frank |
| 2008/0178148 | A1 | 7/2008 | Enyeart et al. |
| 2009/0043507 | A1 | 2/2009 | Dommisse et al. |
| 2009/0125288 | A1 | 5/2009 | Main et al. |
| 2009/0141028 | A1 | 6/2009 | Arora |
| 2009/0144032 | A1 | 6/2009 | Arora |
| 2009/0157319 | A1 | 6/2009 | Mitchell |
| 2009/0319243 | A1* | 12/2009 | Suarez-Rivera ........ E21B 43/00 |
| | | | 703/10 |
| 2010/0125349 | A1 | 5/2010 | Abasov et al. |
| 2010/0214870 | A1 | 8/2010 | Pepper et al. |
| 2011/0002194 | A1 | 1/2011 | Imhof et al. |
| 2011/0011595 | A1 | 1/2011 | Huang et al. |
| 2011/0042098 | A1 | 2/2011 | Imhof |
| 2011/0115787 | A1 | 5/2011 | Kadlec |
| 2011/0122136 | A1 | 5/2011 | Jo |
| 2011/0172976 | A1 | 7/2011 | Budiman et al. |
| 2011/0181610 | A1 | 7/2011 | Baggs et al. |
| 2011/0213577 | A1* | 9/2011 | Mousavi ............ G01R 19/2513 |
| | | | 702/66 |
| 2011/0313743 | A1 | 12/2011 | Oury et al. |
| 2012/0010865 | A1 | 1/2012 | Benson |
| 2012/0080197 | A1 | 4/2012 | Dickens et al. |
| 2012/0253770 | A1 | 10/2012 | Stern et al. |
| 2013/0090855 | A1 | 4/2013 | Rasmus et al. |
| 2013/0169644 | A1* | 7/2013 | Bolton ..................... H04Q 9/00 |
| | | | 345/440 |
| 2013/0229891 | A1 | 9/2013 | Witte et al. |
| 2013/0262052 | A1 | 10/2013 | Mallet et al. |
| 2013/0332131 | A1 | 12/2013 | Russell |
| 2014/0140580 | A1 | 5/2014 | Neave |
| 2014/0142906 | A1 | 5/2014 | Berezin et al. |
| 2014/0222347 | A1 | 8/2014 | Bashore |
| 2014/0254884 | A1 | 9/2014 | Elkington et al. |
| 2014/0262246 | A1 | 9/2014 | Li et al. |
| 2014/0316706 | A1 | 10/2014 | Grant et al. |
| 2015/0098627 | A1 | 4/2015 | Ye |
| 2015/0198029 | A1 | 7/2015 | Chen |
| 2016/0139282 | A1 | 5/2016 | Dimitrov |
| 2016/0237810 | A1 | 8/2016 | Beaman, Jr. et al. |
| 2018/0253873 | A1 | 9/2018 | White et al. |

FOREIGN PATENT DOCUMENTS

| | | |
|---|---|---|
| WO | WO 2010/110824 | 9/2010 |
| WO | WO 2011/100009 | 8/2011 |

OTHER PUBLICATIONS

PCT/US13/68348, PCT Written Opinion of the International Searching Authority dated Apr. 29, 2014 (4 pgs.).

PCT/US13/68348, PCT International Preliminary Report on Patentability dated May 5, 2015 (5 pgs.).

PCT/US13/68349, PCT International Search Report dated Jan. 30, 2014 (3 pgs.).

PCT/US13/68349, PCT Written Opinion of the International Searching Authority dated Jan. 30, 2014 (5 pgs.).

PCT/US13/70838, PCT International Search Report dated Apr. 9, 2014 (3 pgs.).

PCT/US13/70838, PCT Written Opinion of the International Searching Authority dated Apr. 9, 2014 (5 pgs.).

PCT/US13/70838, PCT International Preliminary Report on Patentability dated May 26, 2015 (6 pgs.).

PCT/US14/34546, PCT International Search Report dated Sep. 22, 2014 (3 pgs.).

PCT/US14/34546, PCT Written Opinion of the International Searching Authority dated Sep. 22, 2014 (8 pgs.).

PCT/US14/34546, PCT International Preliminary Report on Patentability dated Oct. 7, 2014 (12 pgs.).

Admasu et al., Automatic Method for Correlating Horizons Across Faults in 3d Seismic Data, Computer Vision and Pattern Recognition, 2004, CVPR 2004, Proceedings of the 2004 IEEE Computer Society Conference, vol. 1 (6 pgs.).

Andersen, et al., Seismic Waveform Classification: Techniques and Benefits, dated Mar. 2004; pp. 26-29 (4 pgs.).

Aurnhammer et al., A Genetic Algorithm for Automated Horizon Correlation Across Faults in Seismic Images, IEEE Transactions on Evolutionary Computation, vol. 9., No. 2, Apr. 2005 (10 pgs.).

Can, Probabilistic Performance Forecasting for Unconventional Reservoirs with Stretched-Exponential Model, Diss. Texas A&M University, May 2011 (74 pgs.).

Castro de Matos, et al., *Unsupervised Seismic Facies Analysis Using Wavelet Transform and Self-Organizing Maps*, dated Dec. 13, 2006; vol. 72, No. 1, pp. P9-P21, 19 Figs. (13 pgs.).

Chang et al., *NMR Characterizations of Properties of Heterogeneous Media*, Research Report, Final Report; U.S. Dept. of Energy, DOE Award No. DE-AC26-99BC15202, Texas A&M University, 2005, pp. 1-151 (151 pgs.).

Coleou, et al.; *Unsupervised Seismic Facies Classification: A Review and Comparison of Techniques and Implementation*, The Leading Edge, dated Oct. 2003; pp. 942-953; (7 pgs.).

Diersen et al., Classification of Seismic Windows Using Artificial Neural Networks, dated 2011; pp. 1-10 (10 pgs.).

Dijkstra; A Note on Two Problems in Connexion with Graphs, Numerische Mathematik 1, pp. 269-271, dated Jun. 11, 1959 (3 pgs.).

Hintze, *NCSS Data Analysis User's Guide III, Regression and Curve Fitting*, NCSS 2007. Retrieved from http://ncss.wpengine.netdna-cdn.com/wp-content/uploads/2012/09/NCSSUG3.pdf (653 pgs.).

Hollt et al., Interactive Seismic Interpretation with Piecewise Global Energy Minimization, dated Mar. 1, 2011, pp. 59-66 (8 pgs.).

Jeong et al., A Fast Iterative Method for Eikonal Equations, SIAM J. Sci. Comput., vol. 30, No. 5, pp. 2512-2534, dated Jul. 23, 2008 (23 pgs.).

Kass et al., *Snakes: Active Contour Models*, International Journal of Computer Vision, 321-331, 1988 (11 pgs).

Mortensen et al., *Interactive Segmentation with Intelligent Scissors*, Graphical Models and Image Processing, 60(5):349-384 (1998) (48 pgs).

Ouenes et al., Practical Use of Neural Networks in Tight Gas Fractured Reservoirs: Application to the San Juan Basin, Paper SPE 39965 (1998) (8 pgs.).

Pages from Website: http://www.neuralog.com/pages/NeuraLog.html, printed Dec. 3, 2015 (2 pgs).

Roy, et al., Automatic Seismic Facies Classification with Kohonen Self Organizing Maps—a Tutorial, dated Dec. 2010; pp. 6-14; (9 pgs.).

Valk et al., *Investigation of Key Parameters in SAGD Wellbore Design and Operation*, Journal of Canadian Petroleum Technology, vol. 46, No. 6, Jun. 2007 (8 pgs.).

Welch et al., *Free Form Shape Design Using Triangulated Surfaces*, Computer Graphics, 28, Proc. SIGGRAPH '94, 1994 (preprint) (10 pgs).

Wikipedia. Wikipedia, Overfitting. Revision from Aug. 23, 2012. pp. 1-3. Retrieved from http://en.wikipedia.org/w/index.php?title=Overfitting&oldid=508784472 (3 pgs.).

Goshtasby "Chapter 2: Similarity and Dissimilarity Measures" Image Registration Principle, Tools and Methods, 2012, XVIII, pp. 7-66 (2012).

Morita et al. Extracting time-ordered pairs of similar subsequences by time warping approach, 3rd International Workshop on Mining Temporal and Sequential Data, Aug. 22, 2004 (12 Pages).

(56) References Cited

OTHER PUBLICATIONS

Forth et al., *Application of Statistical Analysis to Optimize Reservoir Performance*, Journal of Canadian Petroleum Technology, Sep. 1, 1997 (7 pgs.).
Herrera, *Automated Seismic-to-well Ties?*, 7th EAGE Conference & Exhibition incorporating SPE EUROPEC 2012, Jun. 1, 2012 (5 pgs.).
Yang, *Integrated Reservoir Description from Seismic, Well Log, to Production Data*, SPE 38381 © May 18, 1997 (9 pgs.).
Zoraster et al., *Curve Alignment for Well-to-Well Log Correlation*, SPE 90471, SPE Annual Technical Conference and Exhibition, Dec. 31, 2004 (6 pgs.).
Lineman et al.: Well-to-Well Log Correlation Using Knowledge-Based Systems and Dynamic Depth Warping, dated Jan. 1, 1987 (Jan. 1, 1987); XP055327735, Retrieved From the Internet URL: https://dspace.mit.edu/bitstream/handle/1721.1/75091/1987.14Lineman et al.Pdf?sequence=1 [retrieved on Dec. 9, 2016] (34 pgs.).
T.J. Hastie et al. "Generalized additive models"—Chapter 7 Statistical Models in S eds, dated 1992 (15 pgs.).
Brown et al., "Seismic Event Tracking by Global Path Optimization," 76th Annual International Meeting, SEG, Expanded Abstracts, 1063-1067, 2006 (4 pgs).
CN Office Action in Chinese Application No. 201480034483.5, dated Feb. 21, 2017, 21 pages (English translation).
EP Office Action in European Patent Application No. 13856215.2, dated Nov. 15, 2017, 5 pages.
Keogh et al., "Derivative Dynamic Time Warping," In Proc. of the First Intl. SIAM Intl. Conf. on Data Mining, Chicago, Illinois, 11 pages (2001).
Muller, "Dynamic Time Warping," Information retrieval for music and motion, 2007, 69-84.
Sakoe et al., "Dynamic programming algorithm optimization for spoken word," Transactions of Acoustics, Speech, and Signal Proc., vol. ASSP-26. pp. 43-49, (1978).

\* cited by examiner

US 10,908,316 B2

RASTER LOG DIGITIZATION SYSTEM AND METHOD

FIELD

The disclosure relates generally to energy resource discovery and in particular to a system and method for processing digital well logs.

BACKGROUND

When a well, such as an oil or gas well, is drilled, it is often logged. The process of logging is to take measurements of various rock properties along the length of the well down into the ground. These measurements are sometimes digitally recorded and sometimes recorded on a paper graph. Subsequently, paper graphs can be scanned into an image (often referred to as a 'raster log').

The problem is to turn a raster log (which are basically images of graphs) into a digital curve. The digital curve is the preferred way to interpret geology since it is very hard to interpret the geology of the well from the images alone. There are millions of raster logs in existence and a technique to generate a digital curve will allow the potential of the raster logs to be unlocked more quickly.

The raster logs are difficult to digitize because measurements beyond the base scale are logged by wrapping around the log. For example, if a raster log is measuring gamma ray density and the measurement is mostly between 0-200 units, the raster log must handle "other" measurement values wrapping the graph around and plotting the peak on the other side of the graph. Thus, the scale on the graph is 0-200 and then 200-400 units, which makes the raster log very difficult to digitize. It is desirable to overcome this and other problems of typical raster logs.

Another existing solution simply hand draws the curve on the graph. In this solution, the wrapped around section is also drawn on the raster, it is sometimes labelled as 'off-scale'.

Existing solutions to the above problem are slow, prone to errors and/or inaccurate since it difficult to interpret the raster logs for the reasons above. In most current systems, the off-scale parts of the curve are either dragged across the screen to the right location or the application knows to add an offset to it before the curve is generated. Sometimes the off-scale parts of the graph are hand drawn in the right location with no guide. It can become very difficult and time consuming to see if this process is working correctly and it is desirable to provide a different solution.

DETAILED DESCRIPTION OF ONE OR MORE EMBODIMENTS

The disclosure is particularly applicable to a raster log from an oil or gas well and it is in this context that the disclosure will be described. It will be appreciated, however, that the raster log digitization system and method may be used for other types well logs, other types of wells including water wells, and implemented using other techniques and components not specifically described below.

The raster log digitization system and method may help turn well known raster logs into a novel digital curve. The novel digital curve makes it easier to interpret geology shown in the raster log. The system and method also handles raster logs in which the values of the measurements captured by the raster log overlap each other (or wrap around) as described above.

Figure 1:
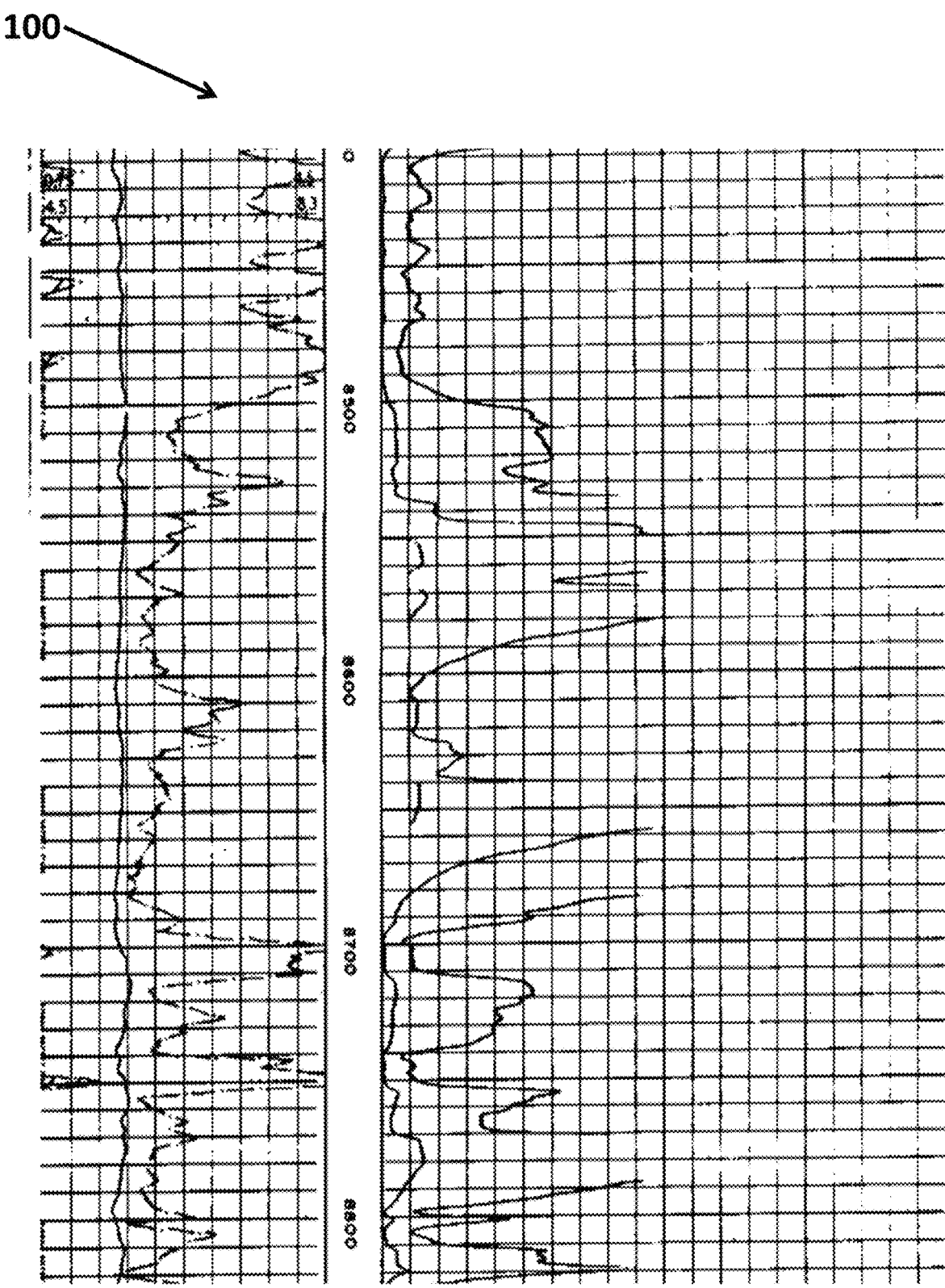
FIG. 1 illustrates a typical raster log.

FIG. 1 illustrates a typical raster log 100 and in particular a small section of a raster log. A full raster log is a log of measurements from various depths of a well. The partial well log 100 shown in FIG. 1 has center numbers, 8500-8800, that represent a measured depth down a well at which one or more measurement(s) are taken. Different value of different measurements may be measured and represented on the various curves on the well log 100. The well log 100 may include electrical parameter measurements, resistivity parameter measurements, image parameter measurements, porosity parameter measurements, density parameter measurements, neutron porosity parameter measurements, gamma ray parameter measurements and other measurements.

In the well log 100 in FIG. 1, each graph is known as a track. In this case in FIG. 1, the well log 100 has two tracks, one on the left and one on the right. The track on the left contains multiple curves, which is common. For purposes of the below disclosure, the curve on the right that contains a single quantity is focused on as shown in FIG. 2.

Figure 2:
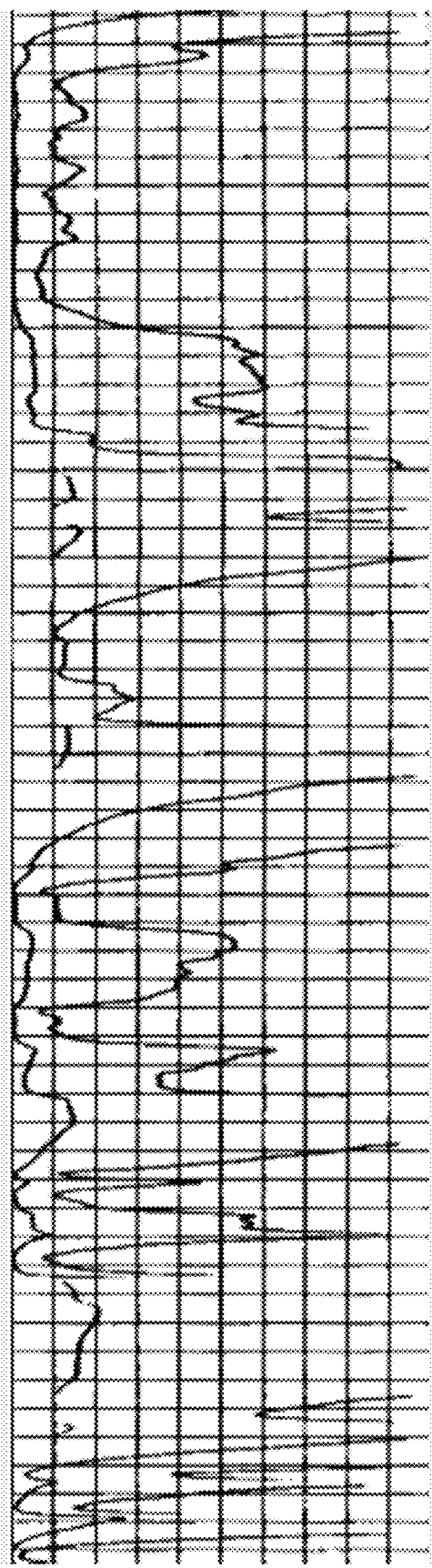
FIG. 2 illustrates a portion of the typical raster log in FIG. 1.
Figure 10:
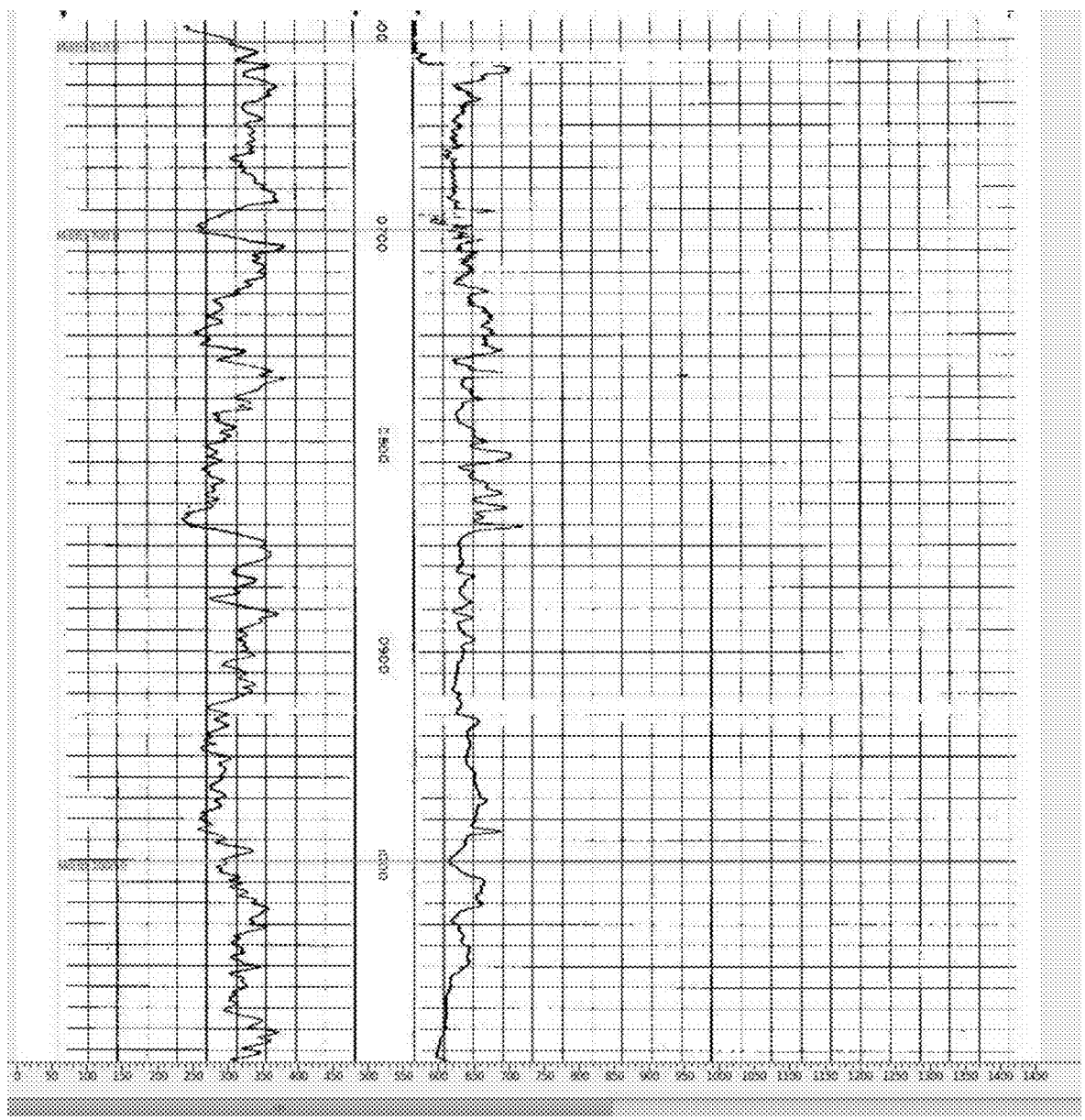
FIG. 10 illustrates an example of a technique for generating the multi-panel outputs of the system.

FIG. 2 shows the track on the right extracted from the input raster. Often the track is not straight in the input raster log image. This track has been cropped to the exact size of the track and has been straightened. FIG. 10 illustrates an example of a technique for generating exemplary multi-panel outputs of the system. The digitization of the raster log component 414 described below may permit the user to layout a grid of reference points across the graph forming a strip of quaderlaterals down the grid. This may be done using a graphical user interface of the digitization of the raster log component 414 where points can be dropped and dragged to the correct locations as shown in FIG. 10. Each horizontal line may be labelled with a measured depth (MD) value. In some embodiments, a process of image warping using bi-linear interpolation may be used to create a straightened graph with MD values on a linear vertical scale. At this point the straightened image may contain multiple tracks.

Figure 3:
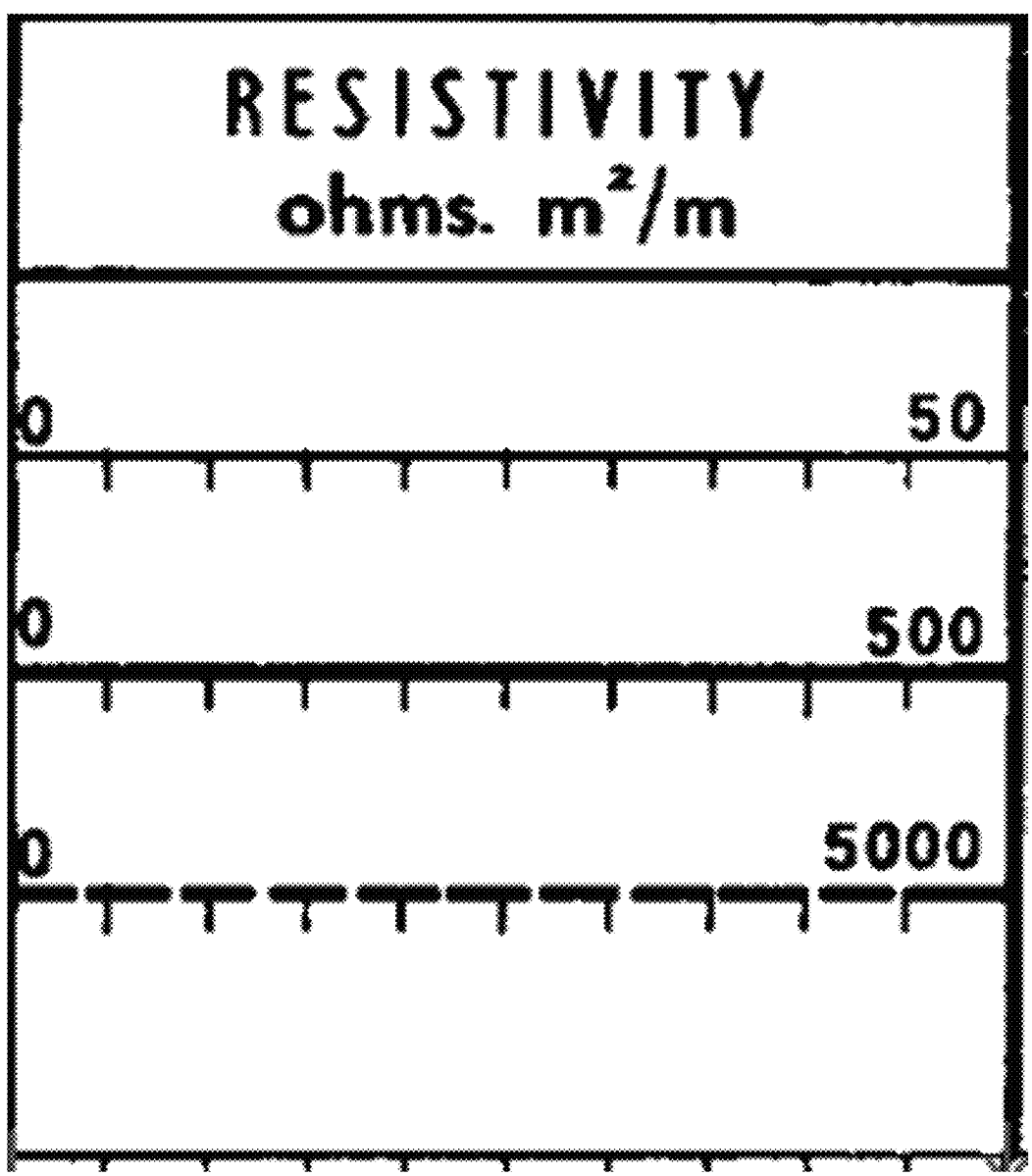
FIG. 3 illustrates a scale of the measurement, resistivity, of the curve in FIG. 2.

FIG. 3 illustrates a scale of the measurement, resistivity, of the curve in FIG. 2. As shown, the measurements of the curve are resistivity. The value of the measurements ranges from 0-50, 0-500 and 0-5000 ohms. This means numbers from 0-50 are represented on the main scale, numbers from 50-500 wrap back into the image and numbers from 500-5000 wrap back a second time yielding a quite complex graph as shown in FIG. 2. It should be noted that a value of 50.001 wraps back to a location approximately 10% through the image. This type of wrapping is the more complex case. The simple case would be a scale of 0-10, 10-20. In this case wrapped curves simply start back on the right hand side. It is desirable to be able to address this wrapping of the values of the measurements since this wrapping phenomenon makes it very different to assess the measurements captured in the well log 100.

Figure 4:
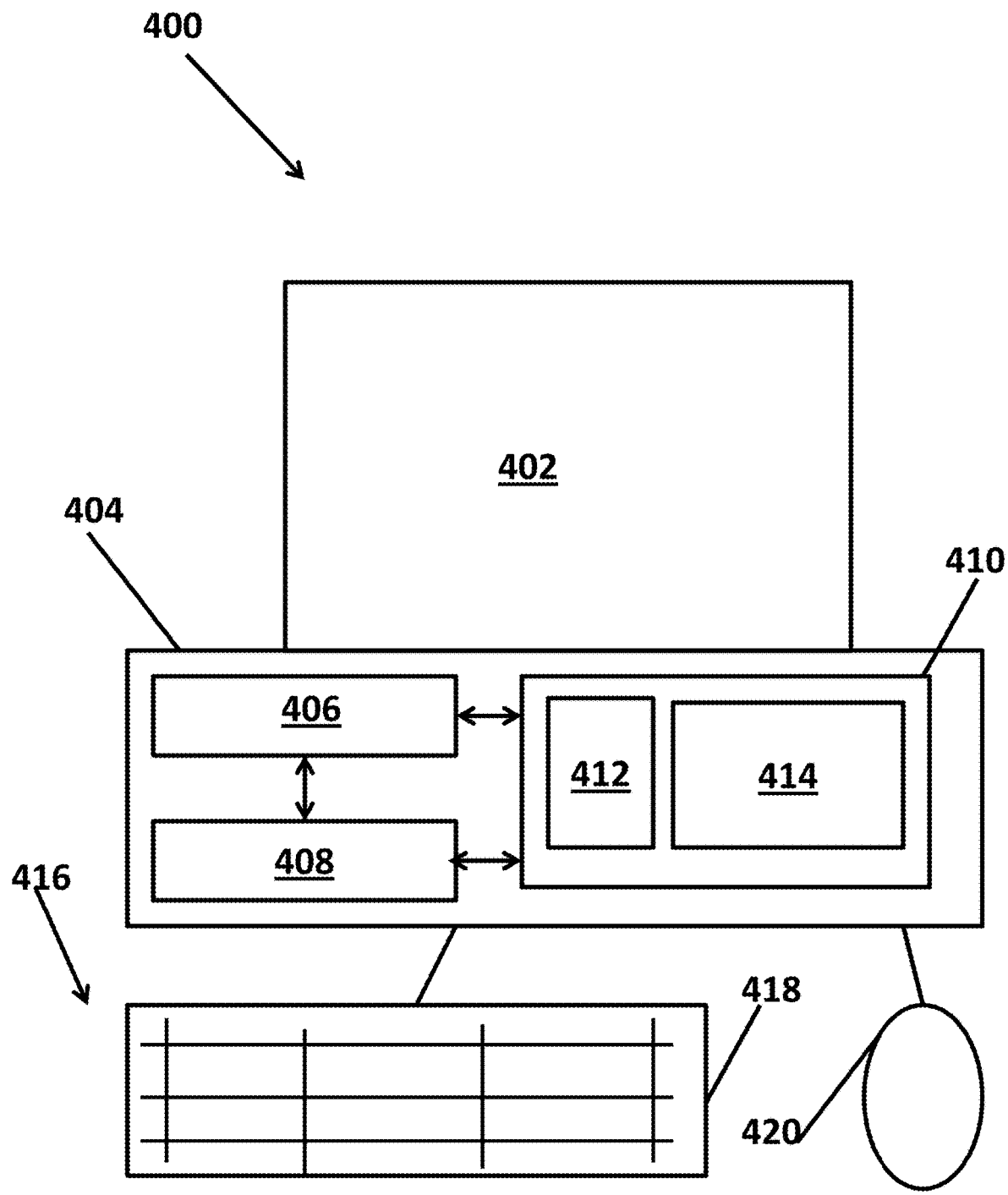
FIG. 4 illustrates a first embodiment of an example of a system for generating a digitized raster log.

FIG. 4 illustrates a first embodiment of an example of a system 400 for generating a digitized raster log. In one example of an embodiment of the system, the system may be implemented on a single computer system as shown in FIG. 4 that may include, for example, a display device 402 and a chassis 404 that implement a digitization of the raster log system as described below. In one embodiment, the digitization of the raster log system may be a plurality of lines of computer code that may be stored on the computer (or downloaded to the computer) and executed by one or more processor(s) of the computer. In other embodiments, the digitization of the raster log system may be one or more hardware devices (a microcontroller, a programmable logic device (PLD), a field programmable gate array or other hardware components) that may be housed in the computer and the hardware device to implement a multi-panel digitization of the raster log.

The chassis 404 may further comprise one or more processors 406, a persistent storage device 408 and a memory 410 that may be interconnected. The memory may store a typical operating system 412 and a digitization of the raster log component 414. The digitization of the raster log component 414 may be implemented in software or hardware as described above so it may be executed by the processor 406 in the computer system in FIG. 4. The computer system 400 may also have one or more input/output devices 416 such as a mouse 418 and a keyboard 420 for example. The memory or persistent storage may also store one or more well logs that may be processed by the digitization of the raster log component 414 as described below. The digitization of the raster log component 414 may generate, in some embodiments, a multi-panel digital log as shown in the examples.

Figure 5:
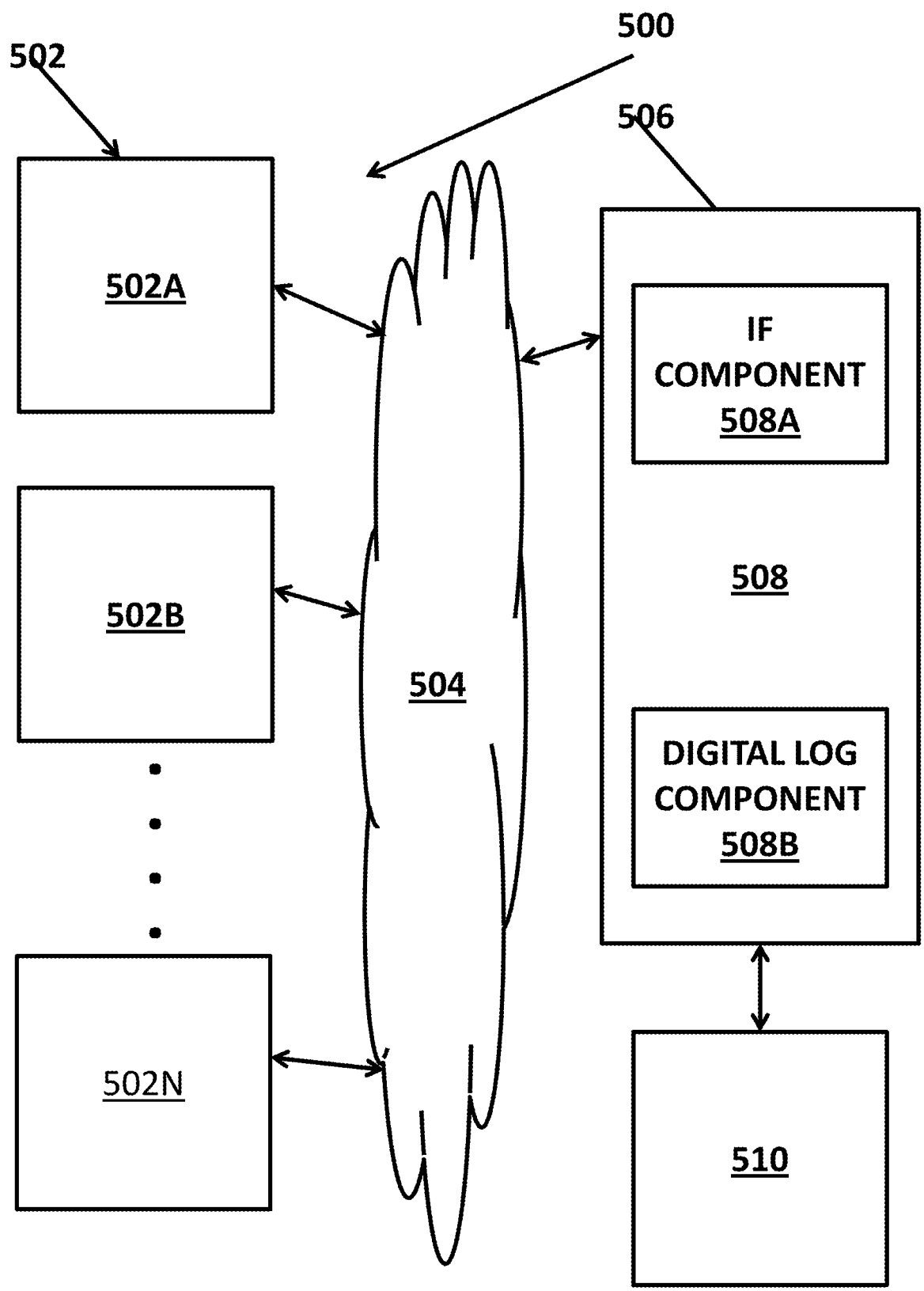
FIG. 5 illustrates a second embodiment of an example of a system for generating a digitized raster log.

FIG. 5 illustrates a second embodiment of an example of a system 500 for generating digitized raster log. In this system 500, the system may have one or more computing device 502, coupled and interconnected over a communications path 504, to a backend component 506 that may have a multi-panel digitization of the raster log component. Each computing device 502, such as computing device 502A, computing device 502B, . . . , computing device 502N) may be a processor based device that may be used by a user to access the backend component 506 such as to upload a well log or request a multi-panel digitalization of the well log as described below. For example, each computing device may be a smartphone device, a personal computer, a laptop computer, a tablet computer and the like. In some embodiments, each computing device 102 may have an application that assists the user to interact with the multi-panel digitalization of the well log. For example, the application may be a typical browser application, a mobile application downloaded to the computing device 102 or any other application.

The communications path 504 may be a wireless, wired or a combination of wireless and wired communications path. It may be a digital computer network, a digital cellular wireless network, a WiFi network, an Ethernet network and the like. The backend 506 may be connected to a store 510 that may be a hardware or software storage device. The store 510 may store one or more well logs that may be processed using the multi-panel digitalization of the well log as well as the plurality of lines of code of the multi-panel digitalization of the well log.

The backend component 506 may have a backend digitization component 508 that may further comprise an interface component 508A that manages and generates the communications and data exchanges with each computer device 102 and a digital log component 508B that performs the multi-panel digitization of the well log as described below. Thus, the multi-panel digitization of the well log may be implemented using the digital log component 508B. The digital log component 508B may be implemented in hardware or software as described above.

Figure 6:
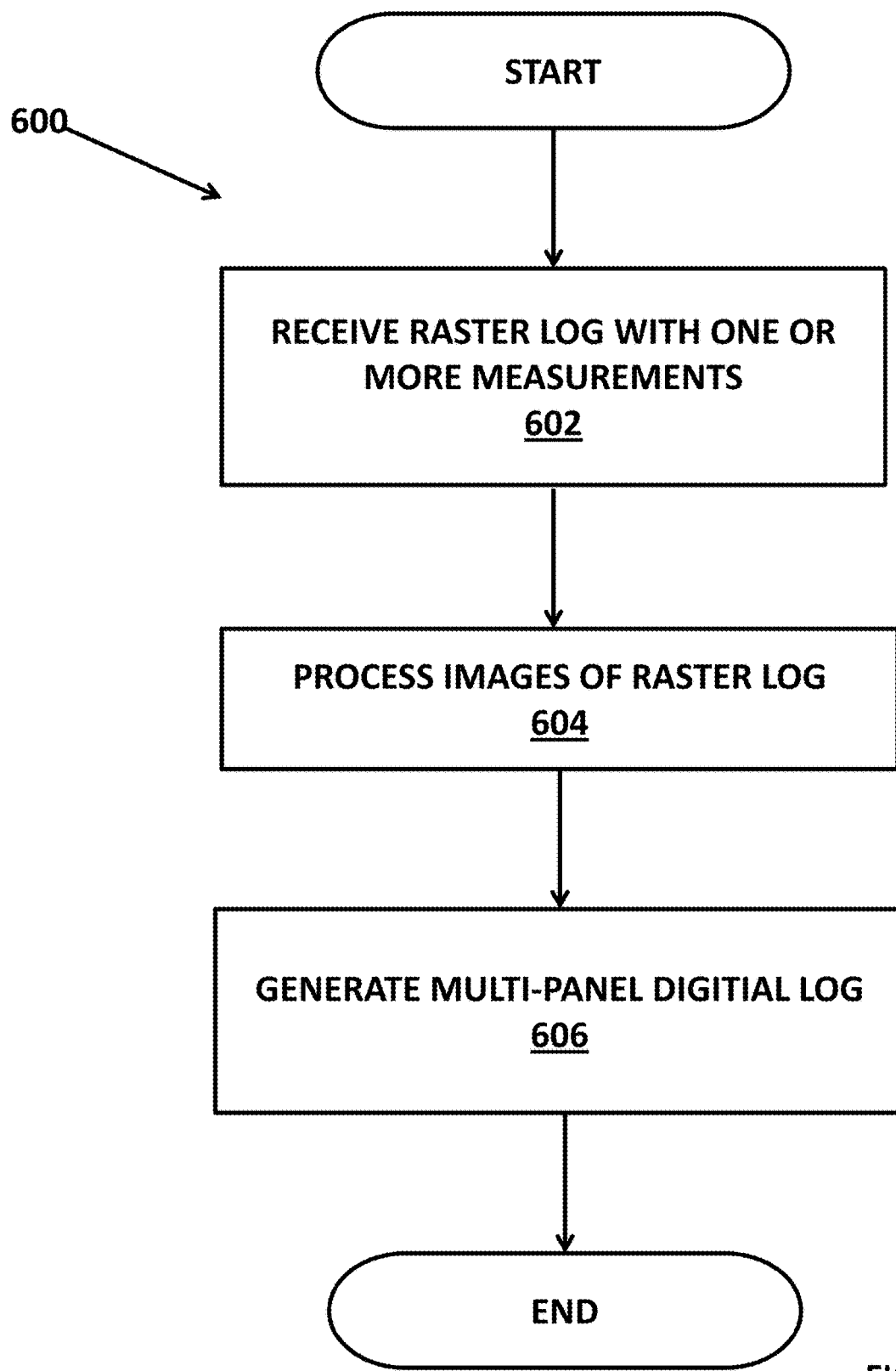
FIG. 6 illustrates an example of a method for digitized raster log generation.

FIG. 6 illustrates an example of a method 600 for digitized raster log generation. The method may receive a well raster log that has one or more measurements (602) and least one measurement has a set of values in which those values wrap around the well log as described above.

Once the well log is received or retrieved from local storage, the method may process images of the well log (604). The processing may include image processing and image straightening. Once the well log is pre-processed, the method automatically generates a multi-panel digital log (606.) In one embodiment, the method may dynamically replicate the image side by side during rendering to thus generate multi-panel digital log. The method may also grey out/deemphasize off-scale images so that the off-scale/wrapped around parts may be more easily distinguishable.

Figure 7:
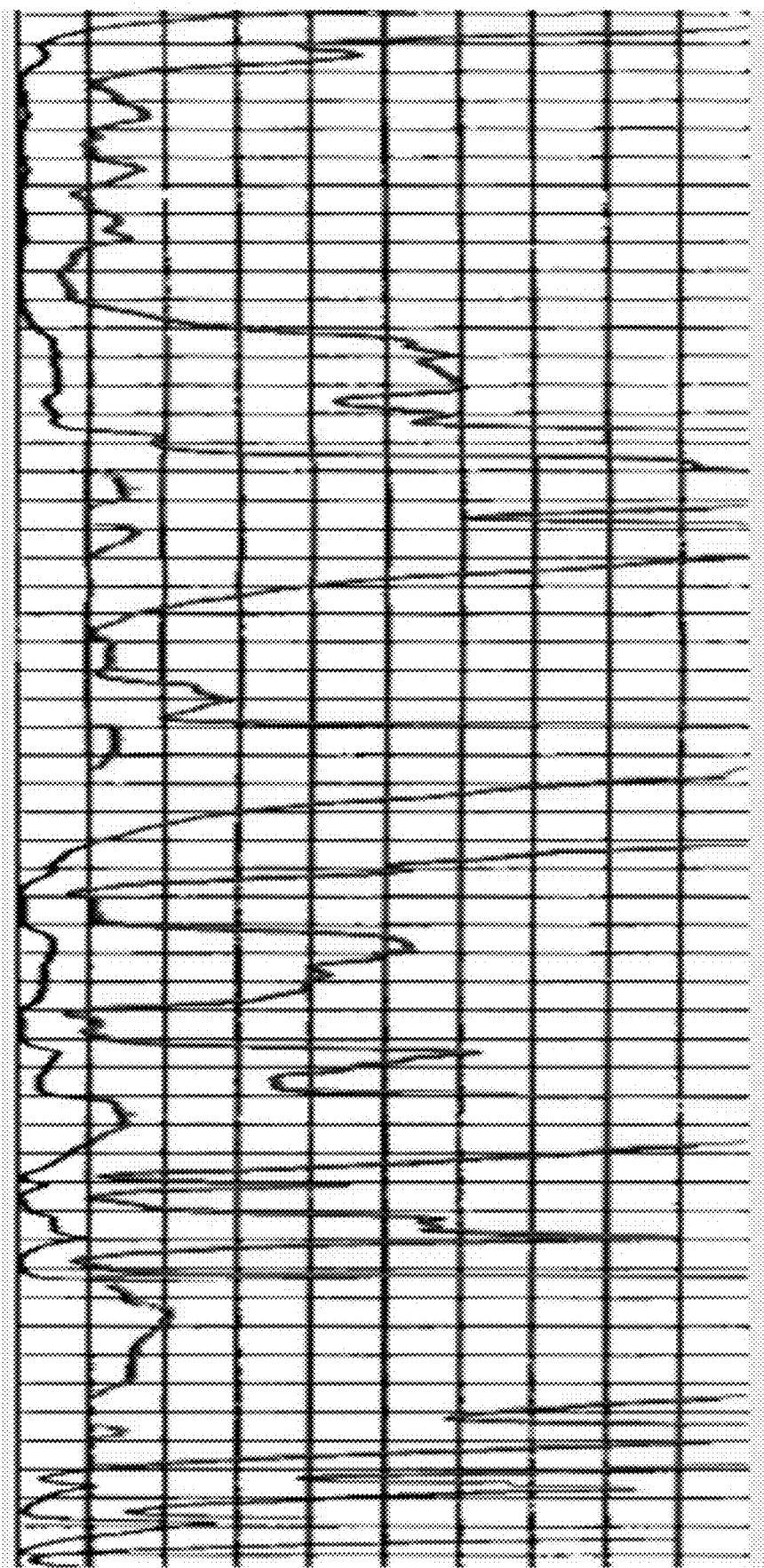
FIG. 7 illustrates an example of a well log with a set of measurements that wrap on the well log.

FIG. 7 illustrates an example of a well log with a set of measurements that wrap on the well log as shown in red. Previous methods of log digitization would interpret on this image directly and an expert is required to really understand the way the curve wraps around and even then mistakes are easily made. Each time the curve goes off the right hand side of the image, the curve wraps back to the 10% from the left edge as shown in FIG. 7.

Figure 8:
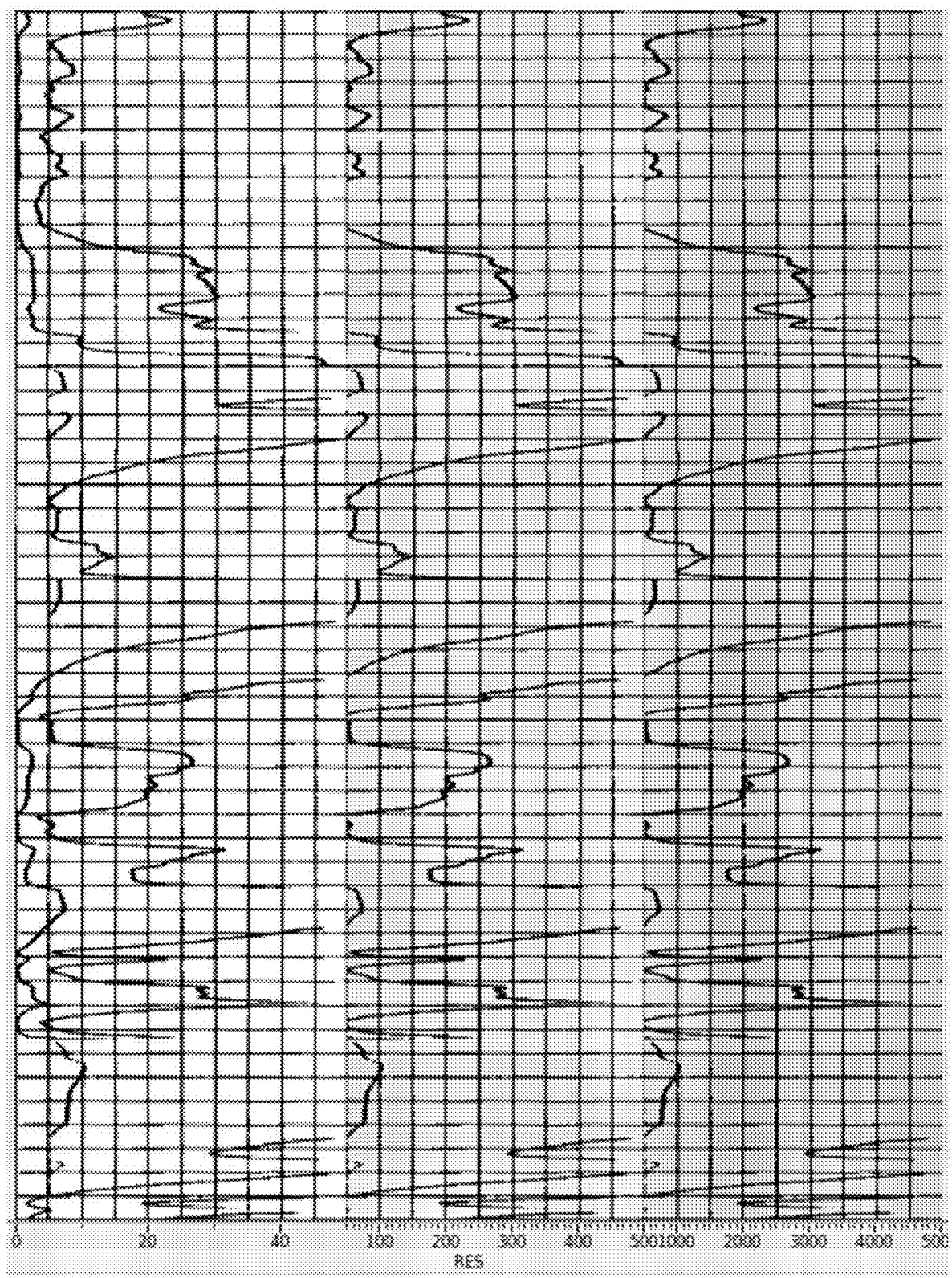
FIG. 8 illustrates multiple panel tracks of the well log.

As shown in FIG. 8, the multi-panel digitization of the well log component 508 takes the track image and duplicate it side by side as shown in FIG. 8 in such a way that the curve becomes continuous across the image. In the example in FIG. 8, the 0-50 part of the track is completely shown whereas the first 10% of the 0-500 & 0-5000 is cropped off. This yields an image where the curve connects from the left hand edge of the 0-50 section to the correct point on the 0-500 section of the image. The scale shows the true value of any point on the curve.

Figure 9:
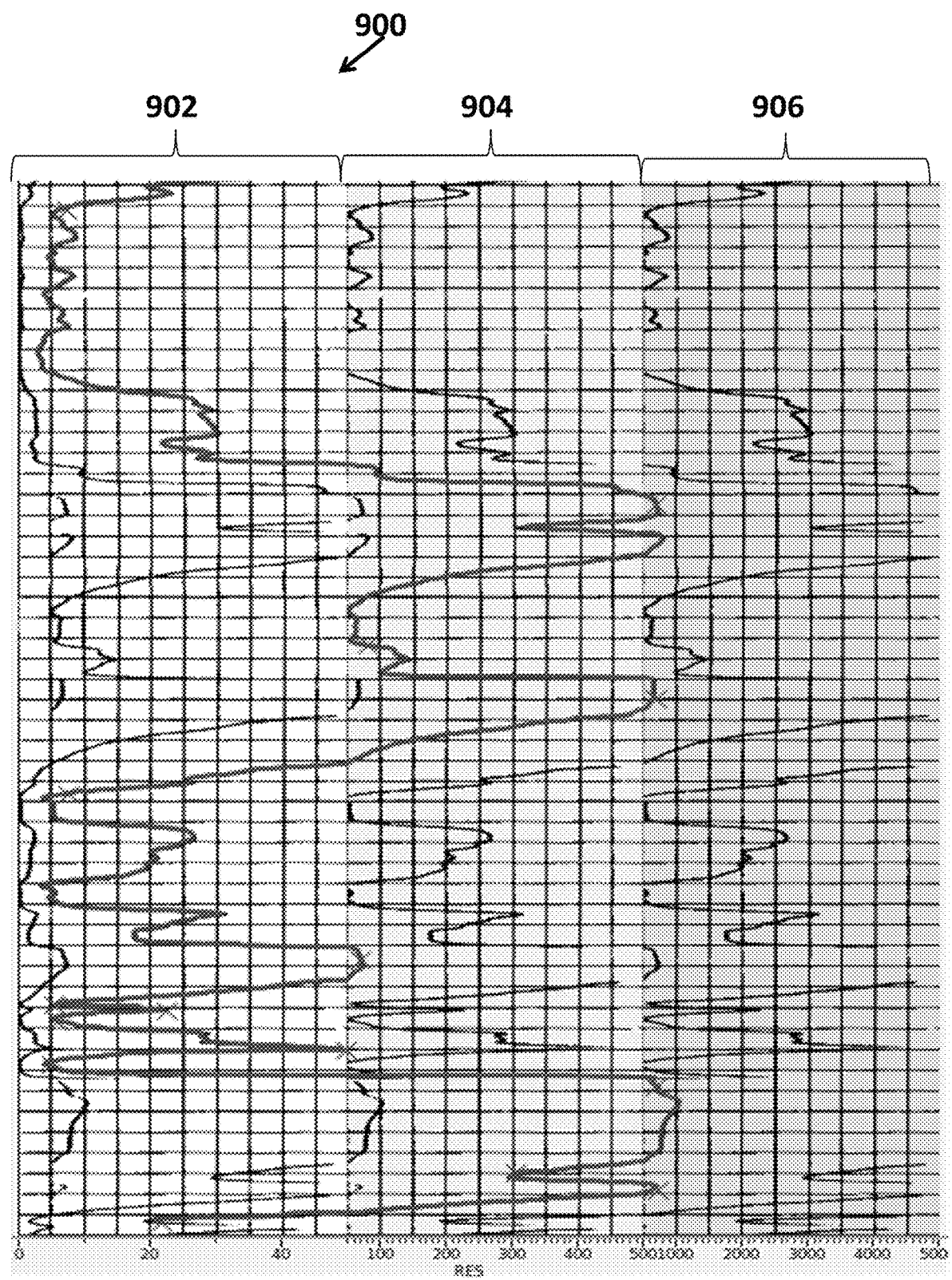
FIG. 9 illustrates an example of a curve digitization on the multi-panel image generated by the system.

FIG. 9 shows the curve digitization on the multi-panel image. It becomes continuous and much easier to digitize. This results in a less error prone result more quickly attained. The actual value at any point in the curve can easily be seen in the generated multi-panel representation of the values of the measurements in a well log. As shown in FIG. 9, the multi-panel image 900 may have one or more regions 902-906 as shown in the example in FIG. 9 in which the values of the set of measurements in each range of measurement values appear. In the example in FIG. 9, the first region 902 shown any resistivity values between 0-50 for various depths in the well, the second region 904 has resistivity values between 50-500 for various depths in the well, and the third region 906 has resistivity values between 500-5000 for various depths in the well. To aid in identification of each panel and each panel boundary, the background of each panel may be colored slightly differently such as a different shade of gray as shown in FIG. 9. In other words, the different shades of the background are used as a visual cue for the user to know which wrap they are on when zoomed into the image. Using the generated multi-panel display generated by the system, a person doing energy discovery work and the like is able to more easily determine a precise value for the well for a measurement at a particular depth since the multi-panel display unwraps the values of the measurements.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method, comprising:
    receiving a hydrocarbon well raster log, the hydrocarbon well raster log comprising one or more values of one or more geologic measurements of a hydrocarbon well and each value of each geologic measurement of the hydrocarbon well being recorded at a plurality of depths of the hydrocarbon well, the hydrocarbon well raster log recording the range of values of at least one measurement over a range and wherein the values of the at least one geologic measurement exceeds the range and the hydrocarbon well raster log recording wraps back onto the hydrocarbon well raster log recording;
    processing the hydrocarbon well raster log, the processing comprising performing an image straightening on the hydrocarbon well raster log that comprises a linear scale associated with a measured depth of the hydrocarbon well;
    subsequent to the processing, generating, by a computer using the processed hydrocarbon well raster log, a hydrocarbon well digital log wherein the hydrocarbon well digital log unwraps the values of the at least one geologic measurement on the hydrocarbon well raster log;
    digitizing a curve from the hydrocarbon well digital log, the digitized curve comprising a continuous curve of the values for the at least one geologic measurement; and
    displaying, by the computer, the generated hydrocarbon well digital log.

2. The method of claim 1, wherein generating the hydrocarbon well digital log further comprises generating a first panel of the hydrocarbon well digital log having a first range of values for the at least one geologic measurement of the hydrocarbon well raster log and generating a second panel of the hydrocarbon well digital log having a second range of values that do not overlap the first range of values for the at least one geologic measurement of the hydrocarbon well raster log.

3. The method of claim 1, wherein generating the hydrocarbon well digital log further comprises generating a third panel of the hydrocarbon well digital log having a third range of values that do not overlap the first and second ranges of values for the at least one geologic measurement of the hydrocarbon well raster log.

4. The method of claim 3 further comprising displaying the hydrocarbon well digital log in which each panel of the hydrocarbon well digital log is displayed adjacent to each other.

5. The method of claim 1, wherein the at least one geologic measurement is one of an electrical parameter, a resistivity parameter, an image parameter, a porosity parameter, a density parameter, a neutron porosity parameter, or a gamma ray parameter of one or more geologic formations adjacent the hydrocarbon well.

6. The method of claim 1, wherein the processing of the hydrocarbon well raster log further comprises performing an image warping on the hydrocarbon well raster log.

7. The method of claim 6, wherein performing the image warping further comprises performing bi-linear interpolation.

8. The method of claim 1, wherein the hydrocarbon well raster log comprises a scanning of a paper hydrocarbon well raster log of the hydrocarbon well.

9. The method of claim 1, further comprising greying out, with the computer, one or more off-scale images of the hydrocarbon well digital log.

10. The method of claim 4, wherein the hydrocarbon well raster log comprises a scanning of a paper hydrocarbon well raster log of the hydrocarbon well.

11. An apparatus, comprising:
a computer system having a processor, a memory and a plurality of lines of instructions; a store that is capable of storing a well log, the hydrocarbon well raster log containing one or more values of one or more geologic measurements of a well and each value of each geologic measurement of the hydrocarbon well being recorded at a plurality of depths of the hydrocarbon well, the hydrocarbon well raster log recording the range of values of at least one geologic measurement over a range and wherein the values of the at least one geologic measurement exceeds the range and wraps around the hydrocarbon well raster log;
the processor of the computer system executing the plurality of lines of instructions and being configured to receive the hydrocarbon well raster log, process the hydrocarbon well raster log by performing an image straightening on the hydrocarbon well raster log that comprises a linear scale associated with a measured depth of the hydrocarbon well and subsequent to the processing, generate a hydrocarbon well digital log from the processed hydrocarbon well raster log, wherein the hydrocarbon well digital log unwraps the values of the at least one geologic measurement on the hydrocarbon well raster log, to digitize a curve from the hydrocarbon well digital log, and the digitized curve comprises a continuous curve of the values for the at least one geologic measurement and to display the generated hydrocarbon well digital log.

12. The apparatus of claim 11, wherein the component is capable of generating a first panel of the hydrocarbon well digital log having a first range of values for the at least one geologic measurement of the hydrocarbon well raster log and generating a second panel of the hydrocarbon well digital log having a second range of values that do not overlap the first range of values for the at least one geologic measurement of the hydrocarbon well raster log.

13. The apparatus of claim 11, wherein the component is capable of generating a third panel of the hydrocarbon well digital log having a third range of values that do not overlap the first and second ranges of values for the at least one geologic measurement of the hydrocarbon well raster log.

14. The apparatus of claim 13, wherein the computer system is capable of displaying the hydrocarbon well digital log in which each panel of the hydrocarbon well digital log is displayed adjacent to each other.

15. The apparatus of claim 11, wherein the at least one geologic measurement is one of an electrical parameter, a resistivity parameter, an image parameter, a porosity parameter, a density parameter, a neutron porosity parameter, or a gamma ray parameter of one or more geologic formations adjacent the hydrocarbon well.

16. The apparatus of claim 11, wherein the computer system is capable of performing an image warping on the hydrocarbon well raster log.

17. The apparatus of claim 16, wherein the computer system is capable of performing bi-linear interpolation.

18. The apparatus of claim 11, wherein the hydrocarbon well raster log comprises a scanning of a paper hydrocarbon well raster log of the hydrocarbon well.

19. The apparatus of claim 11, wherein the computer system is capable of greying out one or more off-scale images of the hydrocarbon well digital log.

20. The apparatus of claim 17, wherein the hydrocarbon well raster log comprises a scanning of a paper hydrocarbon well raster log of the hydrocarbon well.

* * * * *